US012088067B2

(12) United States Patent
Imai et al.

(10) Patent No.: US 12,088,067 B2
(45) Date of Patent: Sep. 10, 2024

(54) SPARK PLUG

(71) Applicant: Niterra Co., Ltd., Nagoya (JP)

(72) Inventors: Susumu Imai, Nagoya (JP); Tatsuya Gozawa, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 18/559,762

(22) PCT Filed: Jun. 6, 2022

(86) PCT No.: PCT/JP2022/022752
§ 371 (c)(1),
(2) Date: Nov. 8, 2023

(87) PCT Pub. No.: WO2023/281957
PCT Pub. Date: Jan. 12, 2023

(65) Prior Publication Data

US 2024/0250507 A1 Jul. 25, 2024

(30) Foreign Application Priority Data

Jul. 9, 2021 (JP) ................................ 2021-113909

(51) Int. Cl.
*H01T 13/08* (2006.01)

(52) U.S. Cl.
CPC .................................... *H01T 13/08* (2013.01)

(58) Field of Classification Search
CPC ................................ H01T 13/08; H01T 13/34
USPC ........................................................... 313/118
See application file for complete search history.

(56) References Cited

U.S. PATENT DOCUMENTS 10,714,908 B1 * 7/2020 Gozawa .................. H01T 13/39
10,790,639 B1 * 9/2020 Imai ........................ H01T 13/16
10,944,244 B2 * 3/2021 Ban .......................... H01T 13/54
11,050,221 B2 * 6/2021 Imai ........................ H01T 13/08
(Continued)

FOREIGN PATENT DOCUMENTS

DE 102022208731 A1 * 2/2024
JP 2006236769 A 9/2006
(Continued)

OTHER PUBLICATIONS

International Search Report mailed Jul. 19, 2022 for the corresponding International Patent Application No. PCT/JP2022/022752 (5 pages including English translation).

*Primary Examiner* — Christopher M Raabe
(74) *Attorney, Agent, or Firm* — Leason Ellis LLP; Melvin C. Garner; Mitsuhiro Haraguchi

(57) ABSTRACT

A spark plug includes an insulator having an axial hole, a center electrode disposed in the axial hole and having a forward end portion projecting to a forward end of the axial hole, a tubular metallic shell which holds the insulator on its inner circumference and has a screw portion formed on its outer circumferential surface, and a ground electrode whose first end portion is fixed to a through hole provided in the metallic shell and whose second end portion forms a discharge gap between the second end portion and the forward end portion. The screw portion has a first screw portion located on a rear end of the through hole and a second screw portion located on a forward end of the through hole, and the first screw portion has a pitch diameter larger than that of the second screw portion.

4 Claims, 2 Drawing Sheets

(56) References Cited

U.S. PATENT DOCUMENTS

| | | | | |
|---|---|---|---|---|
| 11,431,155 | B2 * | 8/2022 | Ban | H01T 13/54 |
| 11,456,578 | B2 * | 9/2022 | Saito | H01T 13/32 |
| 11,637,412 | B2 * | 4/2023 | Mishima | H01T 13/20<br>313/118 |
| 11,695,256 | B2 * | 7/2023 | Sugiura | H01T 13/20<br>313/137 |
| 11,695,258 | B2 * | 7/2023 | Gozawa | F02B 19/12<br>313/143 |
| 11,710,947 | B2 * | 7/2023 | Sugita | F02B 23/08<br>313/143 |
| 11,715,933 | B2 * | 8/2023 | Ban | H01T 13/34<br>313/118 |
| 11,929,594 | B1 * | 3/2024 | Gozawa | H01T 13/08 |
| 2020/0083674 | A1 * | 3/2020 | Imai | H01T 13/08 |
| 2020/0313403 | A1 * | 10/2020 | Imai | H01T 13/08 |

FOREIGN PATENT DOCUMENTS

| | | | |
|---|---|---|---|
| JP | 2019046660 | A | 3/2019 |
| WO | 2019242930 | A1 | 12/2019 |

* cited by examiner

SPARK PLUG

CROSS-REFERENCE TO RELATED PATENT APPLICATIONS

This application is a U.S. National Phase Application under 35 U.S.C. § 371 of International Patent Application No. PCT/JP2022/022752 filed on Jun. 6, 2022 and claims the benefit of priority to Japanese Patent Application No. 2021-113909 filed on Jul. 9, 2021, the contents of all of which are incorporated herein by reference in their entireties. The International Application was published in Japanese on Jan. 12, 2023 as International Publication No. WO/2023/281957 under PCT Article 21(2).

FIELD OF THE INVENTION

The present disclosure relates to a spark plug.

BACKGROUND OF THE INVENTION

A known ignition spark plug used for internal combustion engines is a spark plug which is attached to an engine head and which generates spark discharge between a forward end of a center electrode and a ground electrode (see, for example, JP2019-046660A). In the spark plug described in JP2019-046660A, a through hole is formed in a metallic shell such that the through hole penetrates the metallic shell in a radial direction, and a rod-shaped ground electrode extending in the radial direction is inserted into the through hole and fixed thereto.

CITATION LIST

Patent Literature

Patent Literature 1: JP2019-046660A

Technical Problem

In general, in a spark plug, the closer to the forward end, the higher the temperature, and, thus, the closer to the forward end, the greater the degree of thermal expansion. Therefore, in the case where, as in the spark plug disclosed in JP2019-046660A, an external screw of the metallic shell is also formed on the forward end side of a welded portion of the ground electrode as viewed in the axial direction, as a result of thermal expansion of the external screw on the forward end side, the engine head may be damaged. Meanwhile, in the case where the diameter of the external screw of the metallic shell is decreased so as to prevent damage to the engine head, the gastightness between the external screw of the metallic shell and an internal screw of the engine head may deteriorate. Accordingly, a technique for preventing deterioration of gastightness while preventing damage to the engine head has been demanded.

SUMMARY OF THE INVENTION

Solution to Problem

The present disclosure can be realized as the following aspects.

(1) According to an aspect of the present disclosure, a spark plug is provided. The spark plug has: an insulator having an axial hole extending in an axial direction: a center electrode disposed in the axial hole and having a forward end portion projecting to a forward end side of the axial hole: a tubular metallic shell which holds the insulator on its inner circumferential side and has a screw portion formed on its outer circumferential surface: and a ground electrode whose first end portion is fixed to a through hole provided in the metallic shell and whose second end portion forms a discharge gap between the second end portion and the forward end portion of the center electrode. The screw portion has a first screw portion located on a rear end side of the through hole in the axial direction and a second screw portion located on a forward end side of the through hole in the axial direction, and the first screw portion has a pitch diameter larger than a pitch diameter of the second screw portion. In the spark plug of the aspect, since the pitch diameter of the first screw portion located on the rear end side of the through hole in the axial direction is larger than the pitch diameter of the second screw portion located on the forward end side of the through hole in the axial direction, it is possible to prevent excessive increase of the dimension of the second screw portion in the radial direction, which excessive increase would otherwise occur due to thermal expansion. Also, it is possible to prevent the gap between the first screw portion and an internal screw of an engine head from becoming excessively large, thereby maintaining gastightness at the first screw portion. Accordingly, it is possible to prevent deterioration of gastightness while preventing damage to the engine head.

(2) In the spark plug of the above-described aspect, the pitch diameter of the first screw portion may be 100.30% or more the pitch diameter of the second screw portion. In the spark plug of the aspect, since the pitch diameter of the first screw portion is 100.30% or more the pitch diameter of the second screw portion, it is possible to reduce the gap between the first screw portion and the internal screw of the engine head, thereby preventing deterioration of gastightness further reliably.

(3) In the spark plug of the above-described aspect, the second screw portion may be shorter in length than the first screw portion in the axial direction. In the spark plug of the aspect, since the second screw portion is shorter in length than the first screw portion in the axial direction, the first screw portion can have a sufficient dimension in the axial direction, and, as a result, deterioration of gastightness can be prevented further reliably.

Notably, the present invention can be realized in various aspects and can be realized, for example, as a spark pug manufacturing method, an engine head with a spark plug attached thereto, or the like.

DETAILED DESCRIPTION OF THE INVENTION

A. First Embodiment

Figure 1:
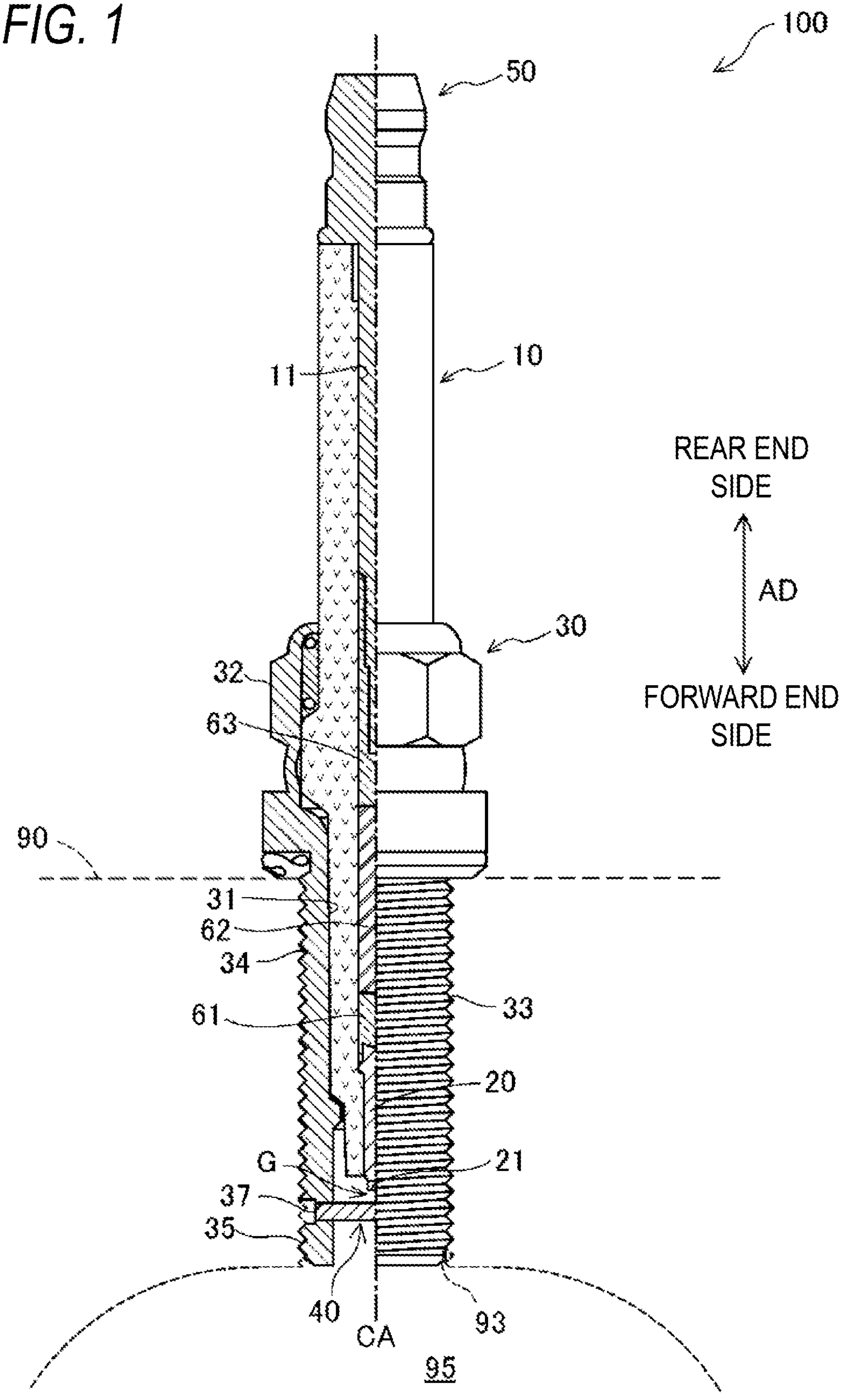
FIG. 1 is a partially sectioned view schematically showing the structure of a spark plug.

FIG. 1 is a partially sectioned view schematically showing the structure of a spark plug 100, which is one embodiment of the present disclosure. In FIG. 1, an axial line CA, which is the center axis of the spark plug 100, is depicted as a boundary line. The external shape of the spark plug 100 is shown on the right side of the sheet, and the cross-sectional shape of the spark plug 100 is shown on the left side of the sheet. In the following description, the lower side of FIG. 1 along the axial line CA (the side where a ground electrode 40, which will be described later, is disposed) will be referred to as the forward end side, the upper side of FIG. 1 (the side where a metallic terminal member 50, which will be described later, is disposed) will be referred to as the rear end side, and the direction along the axial line CA will be referred to as the axial direction AD. In FIG. 1, for convenience of description, an engine head 90 to which the spark plug 100 is attached is shown by a broken line. In general, the engine head 90 has an unillustrated coolant flow passage through which a cooling medium is circulated. The spark plug 100 is attached to the engine head 90 in such a manner that its forward end portion is exposed to a combustion chamber 95.

The spark plug 100 includes an insulator 10, a center electrode 20, a metallic shell 30, the ground electrode 40, and the metallic terminal member 50. Notably, the axial line CA of the spark plug 100 coincides with the axial lines of the insulator 10, the center electrode 20, the metallic shell 30, and the metallic terminal member 50.

The insulator 10 has a generally tubular external shape and has an axial hole 11 extending in the axial direction AD. In the axial hole 11, a portion of the center electrode 20 is accommodated on the forward end side, and a portion of the metallic terminal member 50 is accommodated on the rear end side. Therefore, the insulator 10 holds the center electrode 20 on its inner circumferential side. A portion of the insulator 10 on the forward end side is accommodated in an axial hole 31 of the metallic shell 30, which will be described later, and a portion of the insulator 10 on the rear end side projects from the axial hole 31. The insulator 10 is composed of a ceramic insulator formed by firing a ceramic material such as alumina.

The center electrode 20 is a rod-shaped electrode extending in the axial direction AD and is disposed in the axial hole 11. A forward end portion 21 of the center electrode 20 projects forward from the axial hole 11. A noble metal tip formed of, for example, platinum, an iridium alloy, or the like may be joined to the forward end portion 21. The center electrode 20 of the present embodiment is formed of a nickel alloy whose main component is nickel.

Within the axial hole 11 of the insulator 10, a forward-end-side seal 61, a resistor 62, and a rear-end-side seal 63 are disposed in this order from the forward end side toward the rear end side between the center electrode 20 and the metallic terminal member 50. Therefore, the center electrode 20 is electrically connected, on its rear end side, to the metallic terminal member 50 via the forward-end-side seal 61, the resistor 62, and the rear-end-side seal 63.

The resistor 62 contains ceramic powder, conductive material, and glass as materials. The resistor 62 functions as an electrical resistor between the metallic terminal member 50 and the center electrode 20, thereby suppressing noise produced when spark discharge is generated. Each of the forward-end-side seal 61 and the rear-end-side seal 63 contains electrically conductive glass powder as a material. In the present embodiment, each of the forward-end-side seal 61 and the rear-end-side seal 63 contains, as a material, powder obtained by mixing powder of copper and powder of calcium borosilicate glass.

The metallic terminal member 50 is provided at an end portion of the spark plug 100 on the rear end side. A forward-end-side portion of the metallic terminal member 50 is accommodated in the axial hole 11 of the insulator 10, and a rear-end-side portion of the metallic terminal member 50 projects from the axial hole 11. An unillustrated high voltage cable is connected to the metallic terminal member 50, and a high voltage is applied to the metallic terminal member 50. As a result of the application, spark discharge is generated at a discharge gap G, which will be described later. The spark generated at the discharge gap G ignites an air-fuel mixture in the combustion chamber 95.

The metallic shell 30 has a generally tubular external shape and has the axial hole 31 formed to extend in the axial direction AD. The metallic shell 30 holds the insulator 10 in the axial hole 31. In other words, the metallic shell 30 holds the insulator 10 on its inner circumferential side. The metallic shell 30 is formed of, for example, low carbon steel, and the entirety of the metallic shell 30 is plated with, for example, nickel or zinc. A tool engagement portion 32 and a screw portion 33 are formed on an outer circumferential surface of the metallic shell 30. When the spark plug 100 is attached to the engine head 90, an unillustrated tool is engaged with the tool engagement portion 32. The screw portion 33 is provided in a forward-end-side region of the metallic shell 30 and has a screw thread formed on the outer circumferential surface. The screw portion 33 is screwed into an internal screw portion 93 of the engine head 90. The screw portion 33 will be described in detail later.

Figure 2:
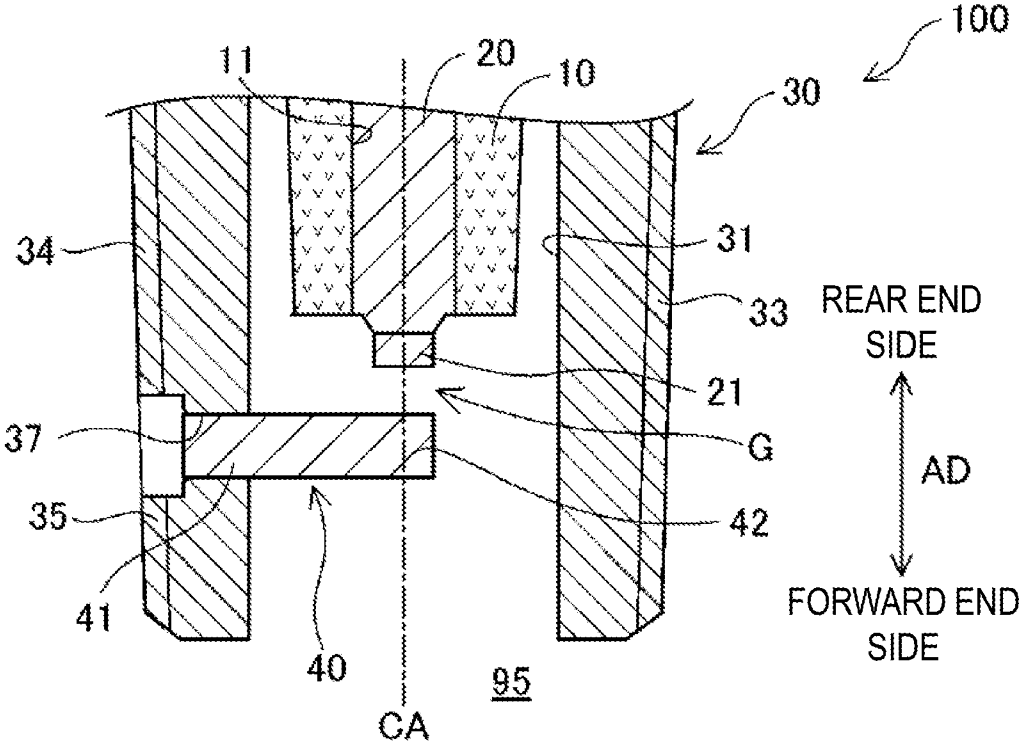
FIG. 2 is a sectional view showing, on an enlarged scale, a forward end of the spark plug and its vicinity.

FIG. 2 is a sectional view showing, on an enlarged scale, a forward end of the spark plug 100 and its vicinity. The metallic shell 30 has a through hole 37 which penetrates the metallic shell 30 in a radial direction. The through hole 37 is formed on the forward end side of the forward end portion 21 of the center electrode 20 in the axial direction AD and establishes communication between the outer circumferential surface and the inner circumferential surface of the metallic shell 30. The through hole 37 is provided at one location in the circumferential direction of the metallic shell 30. The ground electrode 40 is fixed to the through hole 37. In the present embodiment, the through hole 37 has a stepped shape and is formed such that the inner diameter of the through hole 37 on the outer circumferential side of the metallic shell 30 is larger than that on the inner circumferential side of the metallic shell 30.

The ground electrode 40 is composed of a rod-shaped metal member and is disposed to extend in the radial direction. A first end portion 41 of the ground electrode 40 is inserted into the through hole 37 and is fixed thereto. Therefore, the first end portion 41 can be regarded as a fixed portion. A second end portion 42 of the ground electrode 40 faces the forward end portion 21 of the center electrode 20. The discharge gap G for spark discharge is formed between the second end portion 42 and the forward end portion 21 of the center electrode 20. The ground electrode 40 of the present embodiment is formed of a nickel alloy whose main component is nickel as in the case of the center electrode 20. Although the ground electrode 40 of the present embodiment is welded at the through hole 37, whereby the ground electrode 40 is fixed to the through hole 37, the method of fixing is not limited to welding, and the ground electrode 40 may be fixed by means of, for example, press-fitting or the like.

The screw portion 33 formed on the outer circumferential surface of the metallic shell 30 has a first screw portion 34 and a second screw portion 35. The first screw portion 34 is located on the rear end side of the through hole 37 in the axial direction AD. The second screw portion 35 is located on the forward end side of the through hole 37 in the axial direction AD. In the present embodiment, the length of the second screw portion 35 is shorter than the length of the first screw portion 34 as measured in the axial direction AD.

The pitch diameter of the first screw portion 34 is larger than the pitch diameter of the second screw portion 35. In the present specification, the "pitch diameter" shows a value prescribed in JIS B 0205 2001. The pitch diameter of the first screw portion 34 can be obtained by calculating the average of measured pitch diameters of screw threads of the first screw portion 34. Similarly, the pitch diameter of the second screw portion 35 can be obtained by calculating the average of measured pitch diameters of screw threads of the second screw portion 35. As shown in Examples, which will be described later, the pitch diameter of the first screw portion 34 is preferably 100.30% or more the pitch diameter of the second screw portion 35. Notably, the pitch diameter of the first screw portion 34 is preferably 101.00% or less of the pitch diameter of the second screw portion 35.

In the present embodiment, the screw portion 33 is formed such that its pitch diameter increases from the forward end side toward the rear end side in the axial direction AD. Instead of such a configuration, the screw portion 33 may have, for example, a configuration in which the screw threads of the first screw portion 34 are formed to have an approximately constant pitch diameter, the screw threads of the second screw portion 35 are formed to have an approximately constant pitch diameter, and the first screw portion 34 and the second screw portion 35 are continuously formed. Notably, in this case, the first screw portion 34 and the second screw portion 35 may be connected smoothly or connected via a step formed therebetween.

The screw portion 33 can be formed by means of, for example, rolling, cutting, or the like. In the case where the screw portion 33 is formed by means of rolling, the pitch diameter of the first screw portion 34 may be rendered larger than the pitch diameter of the second screw portion 35 by, for example, strengthening pressing forces of dies at a position for forming the second screw portion 35, as compared with those at a position for forming the first screw portion 34. Also, rolling may be performed by using dies each having a step formed at a position corresponding to a position between the position for forming the first screw portion 34 and the position for forming the second screw portion 35. Alternatively, the cylindrical metallic shell 30 before being threaded may have a step between the position for forming the first screw portion 34 and the position for forming the second screw portion 35 or be tapered beforehand at the position for forming the first screw portion 34 and the position for forming the second screw portion 35. Although the first screw portion 34 and the second screw portion 35 are formed as one portion in the present embodiment, the first screw portion 34 and the second screw portion 35 may be formed separately. Notably, the through hole 37 may be formed before formation of the screw portion 33 or after formation of the screw portion 33.

In general, the ground electrode 40 is exposed to combustion of an air-fuel mixture and its temperature becomes high. Therefore, in the spark plug 100 in which the ground electrode 40 is fixed to the through hole 37 formed in the metallic shell 30, the first end portion 41 of the ground electrode 40 may possibly oxidize as a result of overheating. However, in the spark plug 100 of the present embodiment, since the second screw portion 35 is formed on the forward end side of the through hole 37 in the axial direction AD, the second screw portion 35 of the metallic shell 30 can be brought into threading engagement with the internal screw portion 93 of the engine head 90 on the forward end side of the through hole 37 as well. In general, a coolant flow passage is provided in the engine head 90. Therefore, by bringing the second screw portion 35 into threading engagement with the internal screw portion 93, a route for conducting heat from the ground electrode 40 can be also secured in a region on the forward end side of the through hole 37, which region is likely to become higher temperature. Accordingly, since an excessive increase in the temperature of the first end portion 41 of the ground electrode 40 can be prevented, oxidation of the first end portion 41 of the ground electrode 40 can be suppressed. As a result, it is possible to prevent coming off of the ground electrode 40 from the through hole 37 in a thermal cycle of the combustion chamber 95, whereby durability of the spark plug 100 can be enhanced.

In general, the temperature of the vicinity of the forward end of the spark plug 100 tends to increase toward the forward end side in the axial direction AD. Therefore, in the case where the second screw portion 35 is formed on the forward end side (in the axial direction AD) of the through hole 37 to which the ground electrode 40 is fixed, the second screw portion 35 thermally expands more than does the first screw portion 34. If the dimension of the second screw portion 35 in the radial direction increases excessively due to thermal expansion, damage such as cracking may occur at the internal screw portion 93 formed in the engine head 90. However, in the spark plug 100 of the present embodiment, since the pitch diameter of the first screw portion 34 is larger than the pitch diameter of the second screw portion 35; namely, the pitch diameter of the second screw portion 35 is smaller than the pitch diameter of the first screw portion 34, it is possible to prevent excessive increase of the dimension of the second screw portion 35 in the radial direction, which excessive increase would otherwise occur due to thermal expansion. As a result, the spark plug 100 of the present embodiment can prevent damage to the engine head 90.

In the case where the screw portion 33 is formed such that its pitch diameter becomes smaller over the entirety in the axial direction AD unlike the present application, conceivably, damage to the engine head 90 can be prevented because excessive increase of the dimension of the second screw portion 35 in the radial direction can be prevented. However, if the pitch diameter of the screw portion 33 is made smaller, the gap between the screw portion 33 and the internal screw portion 93 becomes excessively large, which may result in deterioration of gastightness. However, in the spark plug 100 of the present embodiment, since the pitch diameter of the first screw portion 34 is larger than the pitch diameter of the second screw portion 35, it is possible to prevent the gap between the first screw portion 34 and the internal screw portion 93 from becoming excessively large, thereby preventing deterioration of gastightness.

As described above, in the spark plug 100 of the present embodiment, since the pitch diameter of the first screw portion 34 located on the rear end side of the through hole 37 in the axial direction AD is larger than the pitch diameter of the second screw portion 35 located on the forward end side of the through hole 37 in the axial direction AD, it is possible to prevent excessive increase of the dimension of the second screw portion 35 in the radial direction, which excessive increase would otherwise occur due to thermal expansion. Also, it is possible to prevent the gap between the first screw portion 34 and the internal screw portion 93 from becoming excessively large, thereby maintaining gastightness at the first screw portion 34. As a result, it is possible to prevent deterioration of gastightness while preventing damage to the engine head 90.

Also, since gastightness can be secured at the first screw portion 34, even when an air-fuel mixture leaks through the gap between the through hole 37 and the first end portion 41 of the ground electrode 40, it is possible to prevent the air-fuel mixture from leaking to the outside along a bearing surface of the spark plug 100. Accordingly, the spark plug 100 of the present embodiment can prevent deterioration of gastightness more reliably as compared with a configuration in which gastightness is secured at the second screw portion 35.

Also, since the pitch diameter of the first screw portion 34 is 100.30% or more the pitch diameter of the second screw portion 35, it is possible to further reduce the gap between the first screw portion 34 and the internal screw portion 93, and, as a result, deterioration of gastightness can be prevented further reliably.

Also, since the length of the second screw portion 35 is shorter than the length of the first screw portion 34 as measured in the axial direction AD, the first screw portion 34 can have a sufficient dimension in the axial direction AD, and, as a result, deterioration of gastightness can be prevented further reliably.

B. Examples

The present invention will next be described in more detail by way of examples; however, the present invention is not limited to the following examples.

<Samples>

Spark plugs 100 were produced as shown in Table 1 below. More specifically, spark plugs 100 in which the pitch diameter of the first screw portion 34 was larger than the pitch diameter of the second screw portion 35 were produced as Examples 1 to 5. Also, spark plugs in which the pitch diameter of the first screw portion 34 was the same as the pitch diameter of the second screw portion 35; i.e., the screw portion 33 had a constant pitch diameter over the entire length in the axial direction AD were produced as Comparative Examples 1 and 2. Comparative Examples 1 and 2 were different from each other in the internal diameter of the screw portion 33, and the pitch diameter of the screw portion 33 of Comparative Example 1 was smaller than the pitch diameter of the screw portion 33 of Comparative Example 2. More specifically, the pitch diameter of the screw portion 33 of Comparative Example 1 was rendered the same as the pitch diameters of the second screw portions 35 of Examples 1 and 5, and the pitch diameter of the screw portion 33 of Comparative Example 2 was rendered the same as the pitch diameters of the second screw portions 35 of Comparative Examples 3 and 4. Also, spark plugs in which the pitch diameter of the first screw portion 34 was smaller than the pitch diameter of the second screw portion 35 were produced as Comparative Examples 3 and 4. In each of Examples and Comparative Examples, 10 samples (spark plugs) having a nominal diameter of M10 and having the same configuration except for the pitch diameter of the screw portion 33 were produced.

<Bush Damage Test>

Each of the spark plugs 100 of Examples and the spark plugs of Comparative Examples was attached to a bush, imitating the engine head 90. The pitch diameter of an internal screw portion 93 formed on an inner circumferential surface of the bush was set to the lower limit of the standard range. The first end portion 41 of the ground electrode 40 and its vicinity were heated by a burner from the axial hole 31 side of the metallic shell 30. Heating of the ground electrode 40 at an electrode temperature of 1000° ° C. for two minutes and cooling of the ground electrode 40 at an electrode temperature of 200° ° C. for one minute were performed as a thermal cycle. This thermal cycle was repeated 1,000 times. Determination as to whether the bush was damaged was made by visually observing the bush, whereby damaging characteristic was evaluated. Evaluation criteria are shown below.

A: Damage to the bush was found.

B: No damage to the bush was found.

<Gastightness Test>

Each of the spark plugs 100 of Examples and the spark plugs of Comparative Examples was attached to a bush, imitating the engine head 90. The pitch diameter of the internal screw portion 93 formed on the inner circumferential surface of the bush was set to the lower limit of the standard range. Gastightness was evaluated in accordance with the ISO standard. Specifically, after holding the entirety of each sample spark plug at 200° C. for 30 minutes, a pressure of 2 MPa was applied, and the amount of gas leaked along the bearing surface of the spark plug was measured. Evaluation criteria are shown below.

A: No leakage

B: Leakage at a rate of less than 2 cc/min

C: Leakage at a rate of 2 cc/min or greater

The results of the bush damage test and the gastightness test are shown in Table 1.

Table 1

TABLE 1

| | Average of pitch diameter (mm) | | Ratio of pitch diameter of first screw portion to pitch diameter of second screw portion | Evaluation of damaging characteristic | Evaluation of gastightness |
|---|---|---|---|---|---|
| | First screw portion | Second screw portion | | | |
| Example 1 | 9.268 | 9.212 | 100.61% | A | A |
| Example 2 | 9.288 | 9.252 | 100.39% | A | A |
| Example 3 | 9.272 | 9.244 | 100.30% | A | A |
| Example 4 | 9.256 | 9.230 | 100.28% | A | B |
| Example 5 | 9.234 | 9.212 | 100.24% | A | B |
| Comparative Example 1 | 9.212 | 9.212 | 100.00% | A | C |
| Comparative Example 2 | 9.324 | 9.324 | 100.00% | B | B |
| Comparative Example 3 | 9.312 | 9.324 | 99.87% | B | B |
| Comparative Example 4 | 9.234 | 9.324 | 99.03% | B | C |

The following was found from Table 1. Namely, no damage to the bush was found in Examples 1 to 5 and Comparative Example 1 in which the pitch diameter of the second screw portion 35 was small, and damage to the bush was found in Comparative Examples 2 to 4 in which the pitch diameter of the second screw portion 35 was large. Therefore, it was found that damage to the engine head 90 can be prevented by rendering the pitch diameter of the second screw portion 35 small. Also, through comparison between Examples 1 to 5 and Comparative Example 1, it was found that, in Examples 1 to 5 and in which the pitch diameter of the first screw portion 34 was larger than the pitch diameter of the second screw portion 35, deterioration of gastightness was able to be suppressed as compared with Comparative Example 1 in which the pitch diameter of the first screw portion 34 was the same as the pitch diameter of the second screw portion 35. In particular, in the case of Examples 1 to 3 in which the pitch diameter of the first screw portion 34 was 100.30% or more the pitch diameter of the second screw portion 35, no leakage was observed in the gastightness test. It was found from this that, in Examples 1 to 3, deterioration of gastightness was prevented more reliably. It is considered that, in Examples 1 to 5, since the pitch diameter of the first screw portion 34 was larger than the pitch diameter of the second screw portion 35, the first screw portion 34 and the internal screw portion 93 were able to be brought into close contact with each other, thereby making it possible to prevent deterioration of gastightness. It was found from the results described above that, by rendering the pitch diameter of the first screw portion 34 larger than the pitch diameter of the second screw portion 35, it is possible to prevent deterioration of gastightness while preventing damage to the engine head 90.

Also, it is considered that, in Comparative Example 1, since the screw portion 33 was formed to have a constant small pitch diameter over the entire length in the axial direction AD, damage to the engine head 90 was able to be prevented: however, the degree of close contact between the internal screw portion 93 and the screw portion 33 decreased, and thus, gastightness deteriorated. It is considered that, in Comparative Example 2, since the screw portion 33 was formed to have a constant large pitch diameter over the entire length in the axial direction AD, deterioration of gastightness was able to be prevented: however, damage to the engine head 90 occurred due to thermal expansion of the screw portion 33. It was found from the results of Comparative Examples 2 to 4 that the smaller the pitch diameter of the first screw portion 34, the lower the degree of close contact between the internal screw portion 93 and the first screw portion 34, whereby gastightness deteriorates.

C. Other Embodiments

The structure of the screw portion 33 in the above-described embodiment is merely an example, and various modifications are possible. For example, the length of the second screw portion 35 may be the same as the length of the first screw portion 34 or longer than the length of the first screw portion 34 as viewed in the axial direction AD. Also, the pitch diameter of the first screw portion 34 is not limited to 100.30% or more the pitch diameter of the second screw portion 35 and may be an arbitrary pitch diameter greater than 100% of the pitch diameter of the second screw portion 35. Even when such a configuration is employed, since the pitch diameter of the first screw portion 34 is larger than the pitch diameter of the second screw portion 35, it is possible to prevent deterioration of gastightness while preventing damage to the engine head 90.

The structure of the spark plug 100 in the above-described embodiment is merely an example, and various modifications are possible. For example, the spark plug 100 may be a pre-chamber plug which has a cover provided at the forward end of the metallic shell 30 and forming an auxiliary combustion chamber.

The present invention is not limited to the above-described embodiment and may be embodied in various other forms without departing from the scope of the invention. For example, the technical features in the embodiment corresponding to the technical features in the aspects described in the "SUMMARY OF INVENTION" section can be appropriately replaced or combined in order to solve some of or all the foregoing problems or to achieve some of or all the foregoing effects. A technical feature which is not described as an essential feature in the present specification may be appropriately deleted.

REFERENCE SIGNS LIST

10: insulator, 11: axial hole, 20: center electrode, 21: forward end portion, 30: metallic shell, 31: axial hole, 32: tool engagement portion, 33: screw portion, 34: first screw portion, 35: second screw portion, 37: through hole, 40: ground electrode, 41: first end portion, 42: second end portion, 50: metallic terminal member, 61: forward-end-side seal, 62: resistor, 63: rear-end-side seal, 90: engine head, 93: internal screw portion, 95: combustion chamber, 100: spark plug, AD: axial direction, CA: axial line, G: discharge gap

The invention claimed is:

1. A spark plug comprising:

an insulator having an axial hole extending in an axial direction;

a center electrode disposed in the axial hole and having a forward end portion projecting to a forward end side of the axial hole;

a tubular metallic shell which holds the insulator on its inner circumferential side and has a screw portion formed on its outer circumferential surface; and a ground electrode whose first end portion is fixed to a through hole provided in the metallic shell and whose second end portion forms a discharge gap between the second end portion and the forward end portion of the center electrode, wherein the screw portion has a first screw portion located on a rear end side of the through hole in the axial direction and a second screw portion located on a forward end side of the through hole in the axial direction, and the first screw portion has a pitch diameter larger than a pitch diameter of the second screw portion.

2. The spark plug according to claim 1, wherein the pitch diameter of the first screw portion is 100.30% or more the pitch diameter of the second screw portion.

3. The spark plug according to claim 1, wherein the second screw portion is shorter in length than the first screw portion in the axial direction.

4. The spark plug according to claim 2, wherein the second screw portion is shorter in length than the first screw portion in the axial direction.

* * * * *